United States Patent
Johansson

(10) Patent No.: US 9,083,999 B2
(45) Date of Patent: Jul. 14, 2015

(54) USER BASED ELECTRONIC PROGRAM GUIDES

(75) Inventor: Kay Johansson, Alamo, CA (US)

(73) Assignee: MobiTV, Inc., Emeryville, CA (US)

( * ) Notice: Subject to any disclaimer, the term of this patent is extended or adjusted under 35 U.S.C. 154(b) by 111 days.

(21) Appl. No.: 13/223,157

(22) Filed: Aug. 31, 2011

(65) Prior Publication Data

US 2012/0060180 A1 Mar. 8, 2012

Related U.S. Application Data

(60) Provisional application No. 61/379,512, filed on Sep. 2, 2010.

(51) Int. Cl.
| | |
|---|---|
| H04N 7/16 | (2011.01) |
| H04N 21/254 | (2011.01) |
| H04N 21/45 | (2011.01) |
| H04N 21/258 | (2011.01) |
| H04N 21/262 | (2011.01) |
| H04N 21/2665 | (2011.01) |
| H04N 21/40 | (2011.01) |
| H04N 21/41 | (2011.01) |

(52) U.S. Cl.
CPC ......... *H04N 21/2541* (2013.01); *H04N 21/258* (2013.01); *H04N 21/25816* (2013.01); *H04N 21/25825* (2013.01); *H04N 21/25875* (2013.01); *H04N 21/2665* (2013.01); *H04N 21/26283* (2013.01); *H04N 21/40* (2013.01); *H04N 21/4126* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 6,219,839 B1* | 4/2001 | Sampsell | 725/40 |
| 2005/0160468 A1* | 7/2005 | Rodriguez et al. | 725/109 |
| 2006/0168621 A1* | 7/2006 | Chandhok et al. | 725/44 |
| 2006/0177066 A1* | 8/2006 | Han et al. | 380/277 |
| 2007/0067808 A1* | 3/2007 | DaCosta | 725/62 |
| 2007/0209065 A1* | 9/2007 | Branam et al. | 726/5 |
| 2007/0300259 A1* | 12/2007 | Chan | 725/46 |
| 2008/0235733 A1* | 9/2008 | Heie et al. | 725/46 |

(Continued)

OTHER PUBLICATIONS

Ardissono, Liliana, et al., "Personalized Recommendation of TV Programs". Retrieved from the Internet: <http://www.ies.uci.edu/~kobsa/courses/ICS206/notes/ardissono.pdf> (Accessed May 8, 2013) 12 pgs.

(Continued)

*Primary Examiner* — John Schnurr
*Assistant Examiner* — Cynthia Fogg
(74) *Attorney, Agent, or Firm* — Kwan & Olynick LLP

(57) ABSTRACT

Electronic program guides are generated using device information, content authorization, service levels, and/or interest levels, etc., for a particular user. A viewer can access a user specific electronic program guide on a mobile device, continue accessing the user specific electronic program guide on a computer system, and subsequently move to a large screen television the same electronic program guide. The same user specific electronic program guide may be provided or adjustments to the electronic program guide can be made to account for varying service levels and device capabilities of the different devices. A user may be authorized to view a particular channel on a mobile device but not on a large screen television. In particular examples, a user can seamlessly access a user specific electronic program guide across a variety of authenticated devices associated with a variety of service levels.

16 Claims, 8 Drawing Sheets

(56) References Cited

U.S. PATENT DOCUMENTS

| | | | |
|---|---|---|---|
| 2009/0094662 A1* | 4/2009 | Chang et al. | 725/141 |
| 2009/0100465 A1* | 4/2009 | Kulakowski | 725/39 |
| 2009/0150922 A1* | 6/2009 | Russ et al. | 725/30 |
| 2009/0150958 A1* | 6/2009 | Jerding et al. | 725/116 |
| 2009/0251619 A1* | 10/2009 | Seidel et al. | 348/734 |
| 2010/0205628 A1* | 8/2010 | Davis et al. | 725/25 |
| 2010/0287587 A1* | 11/2010 | Patten et al. | 725/39 |
| 2010/0319017 A1* | 12/2010 | Cook | 725/31 |
| 2011/0258665 A1* | 10/2011 | Fahrny et al. | 725/47 |
| 2011/0302610 A1* | 12/2011 | Karaoguz et al. | 725/46 |
| 2012/0005709 A1* | 1/2012 | Walter | 725/46 |

OTHER PUBLICATIONS

O'Sullivan, Derry, et al., "Improving the Quality of the Personalized Electronic Program Guide", Kluwer Academic Publishers (2003). Retrieved from the Internet: <http://www.ies.uci.edu/~kobsa/courses/ICS206/notes/smyth2.pdf> (Accessed May 8, 2013) 34 pgs.

Baudisch, Patrick, et al., "TV Scout: Guiding Users from Printed TV Program Guides to Personalized TV Recommendation". Retrieved from the Internet: <http://w.patrickbaudisch.com/publications/2002-Baudisch-TV02-TVScoutGuidingUsers.pdf> (Accessed May 8, 2013) 10 pgs.

* cited by examiner

| Date 301 | | Time 311 | Time 313 | Time 315 |
|---|---|---|---|---|
| Channel 321 | ------ | | ------ | |
| Channel 323 | ------ | | ------ | |
| Channel 325 | ------ | | ------ | |
| Channel 327 | ------ | | ------ | |
| Channel 329 | ------ | | ------ | |
| Channel 331 | ------ | | ------ | |

Figure 3

| Date 401 | | Time 411 | Time 413 | Time 415 |
|---|---|---|---|---|
| Channel 421 | icon 431 | Program 441 | | Program 443 |
| Channel 423 | icon 433 | Program 445 | Program 447 | |
| Channel 425 | icon 435 | | Program 451 | |
| Channel 427 | icon 471 | Program 453 | Program 455 | Program 457 |
| Channel 429 | -- | -- | -- | |
| Channel 481 | -- | -- | -- | |

Figure 4

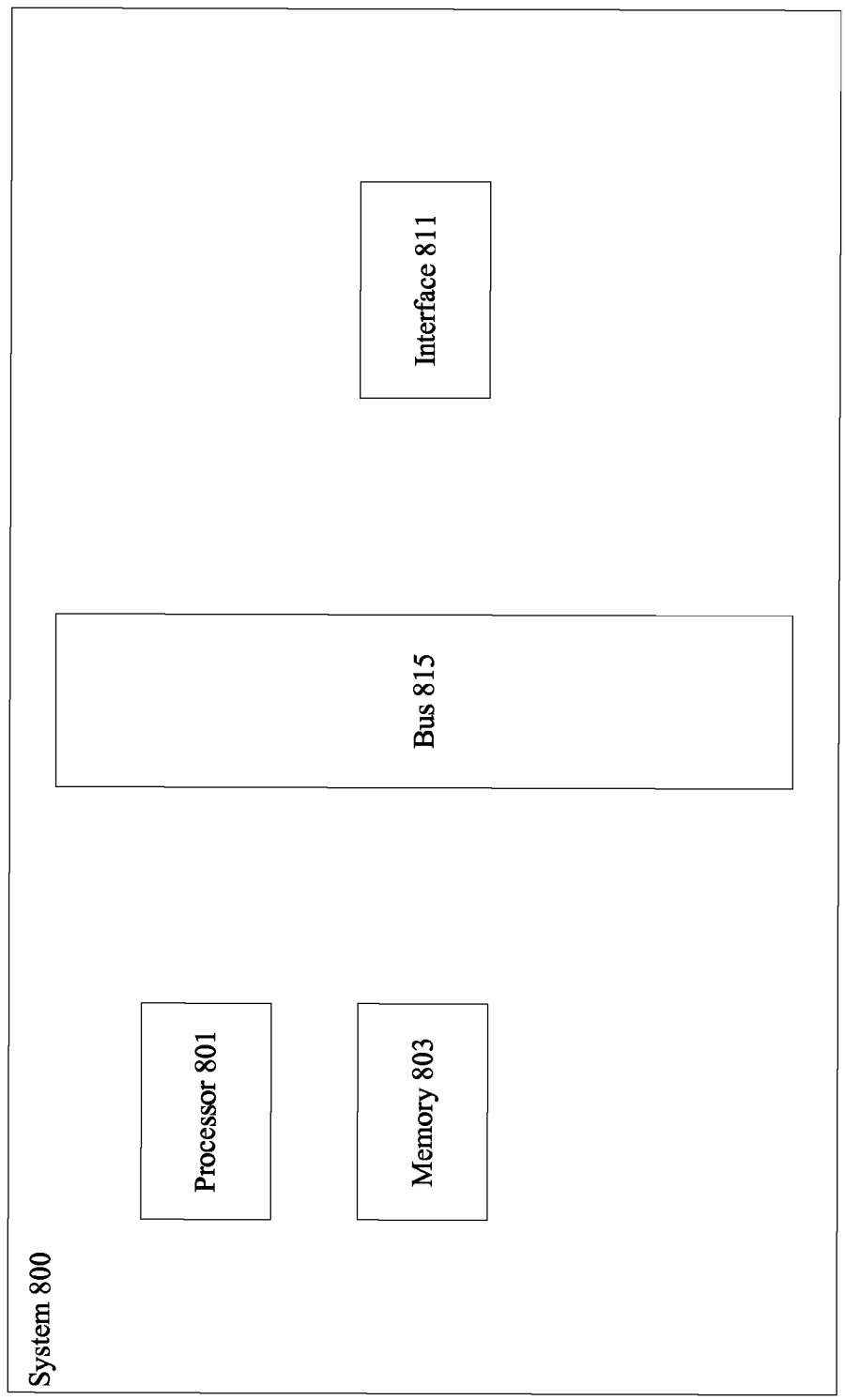

USER BASED ELECTRONIC PROGRAM GUIDES

CROSS-REFERENCE TO RELATED APPLICATION

This application claims the benefit of priority under 35 U.S.C. §119(e) to U.S. Provisional Application No. 61/379,512 (MOBIP056P), titled "USER BASED ELECTRONIC PROGRAM GUIDES," filed Sep. 2, 2010, the entirety of which is incorporated in its entirety by this reference for all purposes.

TECHNICAL FIELD

The present disclosure relates to user based electronic program guides.

DESCRIPTION OF RELATED ART

Electronic program guides typically are device or region specific. A set top box may display an electronic program guide for a particular set of channels that the set top box is authorized to receive. Different viewers using the same set top box will all see the same electronic program guide. In some examples, a user may enter a name and password to get access to program listings for a set of channels the user has selected.

However, mechanisms for providing user based electronic program guides are limited. Consequently, it is desirable to provide improved mechanisms for providing user based electronic program guides.

BRIEF DESCRIPTION OF THE DRAWINGS

The disclosure may best be understood by reference to the following description taken in conjunction with the accompanying drawings, which illustrate particular embodiments.

FIG. 3 illustrates a particular example of a program guide.

FIG. 4 illustrates another example of a program guide.

FIG. 8 illustrates one example of a server.

DESCRIPTION OF EXAMPLE EMBODIMENTS

Figure 1:
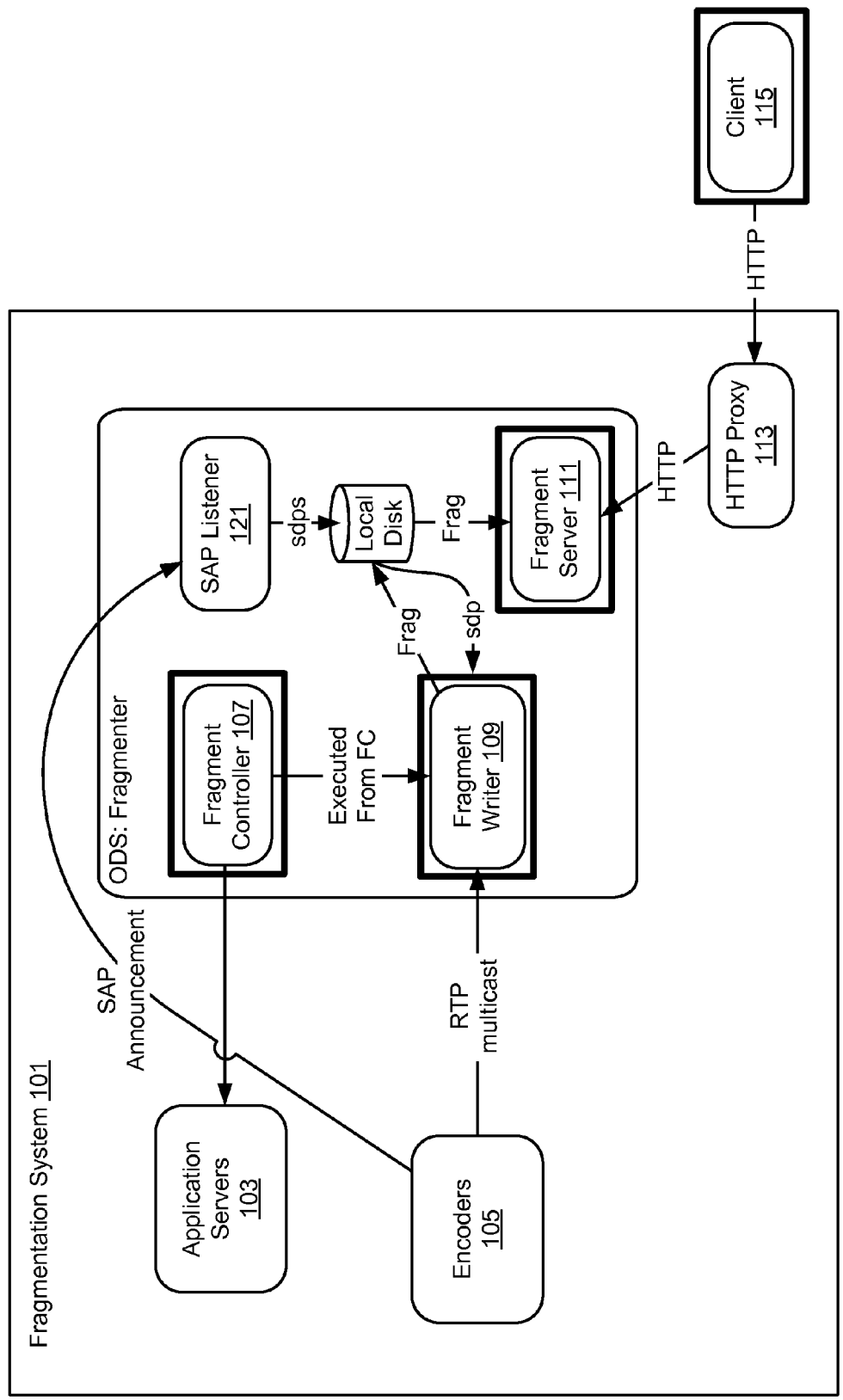
FIG. 1 illustrates one example of a media delivery system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of a particular type of electronic program guide. However, it should be noted that the techniques of the present invention apply to a wide variety of electronic program guides. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Electronic program guides are generated using device information, content authorization, service levels, and/or interest levels, etc., for a particular user. A viewer can access a user specific electronic program guide on a mobile device, continue accessing the user specific electronic program guide on a computer system, and subsequently move to a large screen television the same electronic program guide. The same user specific electronic program guide may be provided or adjustments to the electronic program guide can be made to account for varying service levels and device capabilities of the different devices. A user may be authorized to view a particular channel on a mobile device but not on a large screen television. In particular examples, a user can seamlessly access a user specific electronic program guide across a variety of authenticated devices associated with a variety of service levels.

Example Embodiments

Electronic program guides for television or video services are typically device or region specific. A set top box is configured to display an electronic program guide that includes a particular package of channels. A cable television may receive an electronic program guide for a programming package that is specific to a particular region. However, it is recognized that electronic program guides can be more effectively customized for particular users, devices, regions, and/or subscription levels, etc. According to various embodiments, user specific electronic program guides are generated based on user data, service levels, regions, authorized devices, etc. In some examples, a user specific electronic program guide is generated for a particular mobile device channel package and user interest levels. The user may have a slightly different subscription level on a set top box, and may be able to access three dimensional high definition channels as well as standard definition channels on a set top box.

In particular embodiments, an electronic program guide is tailored to the specific user and adjusted based on device and service levels associated with the device. A user accessing a user specific electronic program guide a single user mobile device may want to seamlessly continue to have access to the user specific electronic program guide on a multiple user large screen television that may or may not reside in the same geographic region. Conventional electronic program guide management mechanisms do not efficiently handle user specific electronic program guide generation across devices, regions, and service levels.

According to various embodiments, user authorizations, device authorizations, service levels, regions, interests, group interests, etc., may also be considered to provide a user with a user, location, and device specific electronic program guide. In particular embodiments, a user is authorized on multiple devices or multiple devices may be registered so that little or no user interaction is required. On a multiple user device such as a set top box, a user can log in for every session or for as along as the device is operating. A particular pin or password may be used on a set top box for the user to access a personalized electronic program guide.

In particular embodiments, electronic program guide content is managed so that there is an identification of what the user is authorized to view on what devices at what quality levels and when. In some examples, an electronic program guide may include an entire high definition channel package on a mobile device but only particular high definition channels on a computer system. In other examples, an electronic program guide may show a particular program on a personalized device such as a mobile phone or a computer but not on a multiple user device such as a set top box. In still other examples, an electronic program guide may show a program on a mobile device using WiFi but not when the mobile device is connecting using a broadband network.

According to various embodiments, a user electronic program guide may show all content across all devices but only when the user is in the vicinity of the device based on mobile device location data. In particular embodiments, a user is determined to be in the vicinity of a device using cell tower triangulation, global positioning system data, face recognition, proximity detection, username password entry, device detection, mobile device transmissions, etc.

In particular examples, an electronic program guide on a device indicates what programming may be held under black out restrictions when the device is located in a particular area but is adjusted to remove black out restriction when the device moves to another region or the user submits additional payment.

A variety of mechanisms are used to deliver media streams and associated electronic program guides to devices. In particular examples, a client establishes a session such as a Real-Time Streaming Protocol (RTSP) session. A server computer receives a connection for a media stream, establishes a session, and provides a media stream to a client device. The media stream includes packets encapsulating frames such as MPEG-4 frames. The MPEG-4 frames themselves may be key frames or differential frames. The specific encapsulation methodology used by the server depends on the type of content, the format of that content, the format of the payload, and the application and transmission protocols being used to send the data. After the client device receives the media stream, the client device decapsulates the packets to obtain the MPEG frames and decodes the MPEG frames to obtain the actual media data.

Conventional MPEG-4 files require that a player parse the entire header before any of the data can be decoded. Parsing the entire header can take a notable amount of time, particularly on devices with limited network and processing resources. Consequently, the techniques and mechanisms of the present invention provide a fragmented MPEG-4 framework that allows playback upon receiving a first MPEG-4 file fragment. A second MPEG-4 file fragment can be requested using information included in the first MPEG-4 file fragment. According to various embodiments, the second MPEG-4 file fragment requested may be a fragment corresponding to a higher or lower bit-rate stream than the stream associated with the first file fragment.

MPEG-4 is an extensible container format that does not have a fixed structure for describing media types. Instead, MPEG-4 has an object hierarchy that allows custom structures to be defined for each format. The format description is stored in the sample description ('stsd') box for each stream. The sample description box may include information that may not be known until all data has been encoded. For example, the sample description box may include an average bit rate that is not known prior to encoding.

According to various embodiments, MPEG-4 files are fragmented so that a live stream can be recorded and played back in a close to live manner. MPEG-4 files can be created without having to wait until all content is written to prepare the movie headers. To allow for MPEG-4 fragmentation without out of band signaling, a box structure is provided to include synchronization information, end of file information, and chapter information. According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

TCP is more widely used than UDP and networking technologies including switch, load balancer, and network card technologies are more developed for TCP than for UDP. Consequently, techniques and mechanisms are provided for delivering fragmented live media over TCP. Sequence information is also maintained and/or modified to allow seamless client device operation. Timing and sequence information in a media stream is preserved.

Requests are exposed as separate files to clients and files should playback on players that handle fragmented MPEG-4. Live or near live, video on demand (VOD), and digital video record (DVR) content can all be handled using fragmentation.

According to various embodiments, playback stoppage is detected at a content server or fragmentation server. In some examples, a device sends a playback stoppage request. In other examples, a content server detects that a subsequent fragment request has not been received. The content server maintains user information and media stream position information. In some examples, the content server also maintains device information and quality or bit rate data. When a request for a fragment or a resume request is received from the same device, or from a different device associated with the same user, the content server identifies bit rate and the media stream along with the appropriate fragment to send to the user. The fragment may correspond to media data transmitted in the past as a live feed and may no longer be live, but the user is able to continue viewing the media stream in a seamless manner at a resolution appropriate for a current viewing device.

The request from the device may include a bit rate and resolution, or a content server may identify an appropriate bit rate and resolution using device information. A resume request along with a desired bit rate may also be received from a different device associated with a user. Fragments maintained at a content server may be used to respond to requests from numerous users on a variety of devices requesting playback of media streams at different points in time and at different quality levels. According to various embodiments, fragments can be maintained once at different quality levels and cached efficiently even though a variety of disparate requests for the same or different media streams will be received.

FIG. 1 is a diagrammatic representation illustrating one example of a fragmentation system 101 associated with a content server that can use the techniques and mechanisms of the present invention. Encoders 105 receive media data from satellite, content libraries, and other content sources and sends RTP multicast data to fragment writer 109. The encoders 105 also send session announcement protocol (SAP) announcements to SAP listener 121. According to various embodiments, the fragment writer 109 creates fragments for live streaming, and writes files to disk for recording. The fragment writer 109 receives RTP multicast streams from the encoders 105 and parses the streams to repackage the audio/video data as part of fragmented MPEG-4 files. When a new program starts, the fragment writer 109 creates a new MPEG-4 file on fragment storage and appends fragments. In particular embodiments, the fragment writer 109 supports live and/or DVR configurations.

The fragment server 111 provides the caching layer with fragments for clients. The design philosophy behind the client/server API minimizes round trips and reduces complexity as much as possible when it comes to delivery of the media data to the client 115. The fragment server 111 provides live streams and/or DVR configurations.

The fragment controller 107 is connected to application servers 103 and controls the fragmentation of live channel streams. The fragmentation controller 107 optionally integrates guide data to drive the recordings for a global/network DVR. In particular embodiments, the fragment controller 107 embeds logic around the recording to simplify the fragment writer 109 component. According to various embodiments, the fragment controller 107 will run on the same host as the fragment writer 109. In particular embodiments, the fragment controller 107 instantiates instances of the fragment writer 109 and manages high availability.

According to various embodiments, the client 115 uses a media component that requests fragmented MPEG-4 files, allows trick-play, and manages bandwidth adaptation. The client communicates with the application services associated with HTTP proxy 113 to get guides and present the user with the recorded content available.

Figure 2:
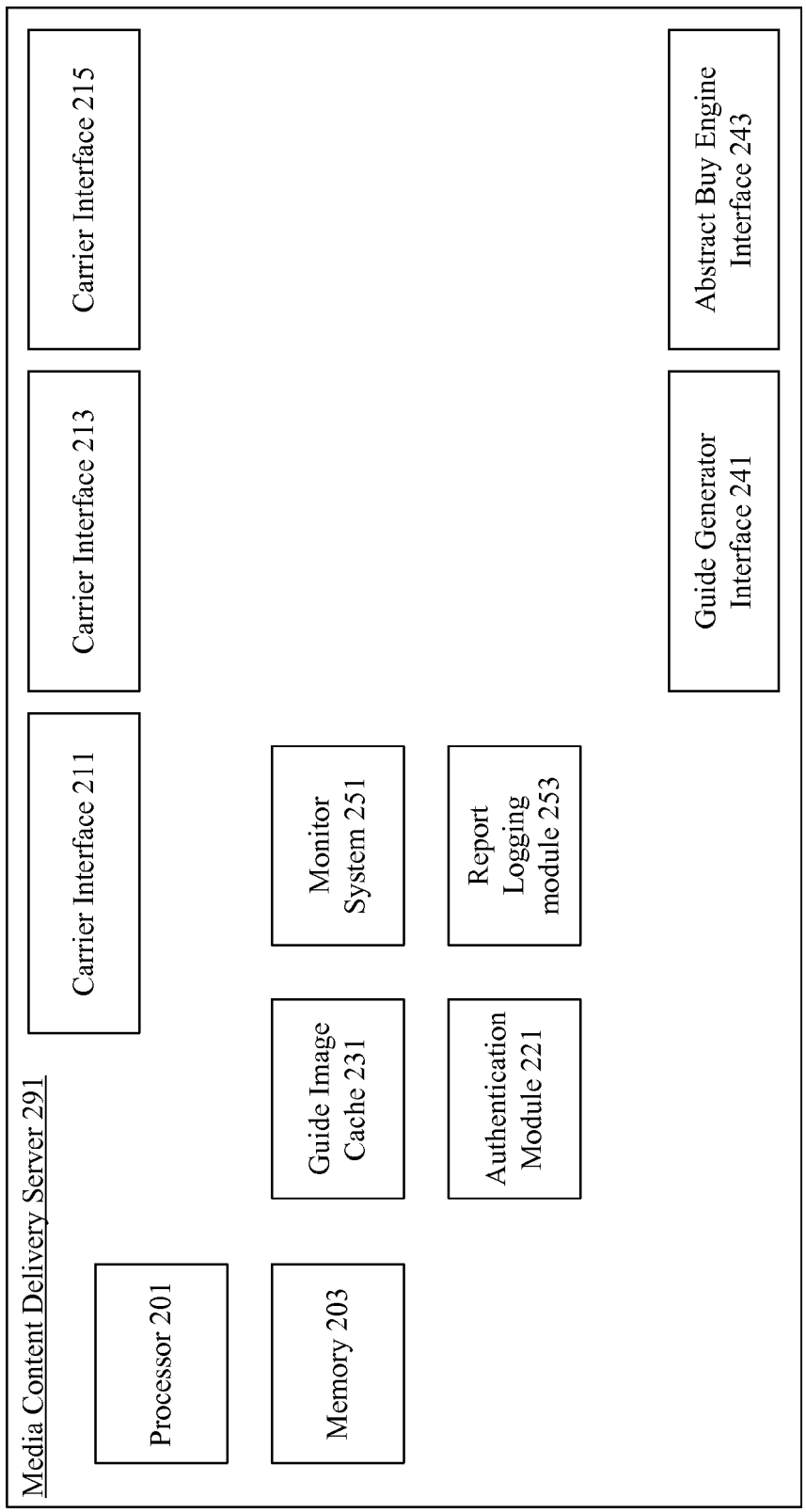
FIG. 2 illustrates another example of a media content delivery server.

FIG. 2 is a diagrammatic representation showing one example of a media content delivery server 291. According to various embodiments, the media content delivery server 291 includes a processor 201, memory 203, and a number of interfaces. In some examples, the interfaces include a guide generator interface 241 allowing the media content delivery server 291 to obtain program guide information. The media content delivery server 291 also can include a program guide cache 231 configured to store program guide information and data associated with various channels. According to various embodiments, the guide generator interface 241 is configured to use information such as user interests, service levels, subscription levels, regional information, device data, etc., to customize an electronic program guide to a particular user, device, region, etc.

The media content delivery server 291 can also maintain static information such as icons and menu pages. The interfaces also include a carrier interface 211 allowing operation with mobile devices such as cellular phones operating in a particular cellular network. The carrier interface allows a carrier vending system to update subscriptions. Carrier interfaces 213 and 215 allow operation with mobile devices operating in other wireless networks. An abstract buy engine interface 243 provides communication with an abstract buy engine that maintains subscription information.

An authentication module 221 verifies the identity of mobile devices. A logging and report generation module 253 tracks mobile device requests and associated responses. A monitor system 251 allows an administrator to view usage patterns and system availability. According to various embodiments, the media content delivery server 291 handles requests and responses for media content related transactions while a separate streaming server provides the actual media streams. In some instances, a media content delivery server 291 may also have access to a streaming server or operate as a proxy for a streaming server. But in other instances, a media content delivery server 291 does not need to have any interface to a streaming server. In typical instances, however, the media content delivery server 291 also provides some media streams. The media content delivery server 291 can also be configured to provide media clips and files to a user in a manner that supplements a streaming server.

Although a particular media content delivery server 291 is described, it should be recognized that a variety of alternative configurations are possible. For example, some modules such as a report and logging module 253 and a monitor 251 may not be needed on every server. Alternatively, the modules may be implemented on another device connected to the server. In another example, the server 291 may not include an interface to an abstract buy engine and may in fact include the abstract buy engine itself. A variety of configurations are possible.

FIG. 3 is an exchange diagram depicting one example of program guide structure information. In some examples, the times 311, 313, and 315 on date 301 cover a time range from time 311 through time 315, such as 3 pm to 5 pm. The program guide structure information provides information identifying channels 321, 323, 325, 327, 329, and 331. In some examples, program guide structure information includes a table of hundreds of channels. According to various embodiments, the program guide is ordered based on real-time determined popularity of programs. That is, the program guide is ordered based on the number of users watching a particular program at that particular time. A program guide can be created by a guide generator from information provided by a variety of content providers and compiled from a number of different users. The program guide structure information may include a listing of channels and not program guide content information for hundreds or thousands of channels.

Available systems download program guide information for all available channels or substantially all subscribed channels. In many instances, an entire program guide is downloaded. Downloading an entire program guide can take an unreasonably long period time, use considerable bandwidth, and consume resources on a device. For mobile devices with media capabilities operating in wireless networks, it is contemplated that it is beneficial to download program guide structure to allow a user to begin navigating while downloading program guide content dynamically based on demand from a user. In some examples, program guide content is downloaded in blocks with the most popular content downloaded first.

The program guide content block size may be determined based on the size of available mobile device memory. In another alternative, a program guide information block size is based upon data transmission rates, server cache block sizes, or available bandwidth. A wide variety of criteria and combinations of criteria can be used in determining a program guide information block size. In other examples, just enough data is downloaded to display a list and allow a user to begin to navigate the program guide information. As the user views different parts of the guide, the detailed content of the guide is downloaded separately and displayed as needed. There is no need to download the entire guide. Only what the user needs to view is downloaded on demand. Potentially limitless guide data can be downloaded in this manner. The user gets immediate feedback and does not need to wait for the data. The guide is not limited to the memory storage on the device or the service bandwidth. Guide data can be constantly updated since only the visible portion needs to be downloaded.

FIG. 4 depicts program guide structure information and program guide content information. Although a particular mechanism for downloading program guides is shown, it should be noted that program guides can be provided in a variety of manners. On many devices, electronic program guides may be provided in their entirety. In one example, program guide structure such as a listing of channels or at least a partial listing of channels is initially downloaded to allow a user to begin navigating. The block of program guide content information is associated with date 401 and times 411, 413, and 415. In another example, the times 411, 413, and 415 cover a time range from time 411 through time 415, such as 3 pm to 5 pm. Programs 441, 443, 445, 447, 451, 453, 455, and 457 are included in the program guide information block. The program guide information block shows program guide information for channels 421, 423, 425, 427, 429, and 481 and corresponding icons 431, 433, 435, and 471. In some examples, a program guide includes information for thousands of channels and video clips. A program guide can be created by a guide generator from information provided by a variety of content providers and from viewership information. Program guide structure information can be unique to each user. According to various embodiments, program guide content information is maintained in relatively generic form and can be cached on a server.

In some examples program guide content information only provides information for channels 421, 423, 425, and 427 and not for hundreds or thousands of other channels. The channels 421, 423, 425, and 427 may correspond to channels corresponding to a particular user's subscription and service levels for a particular device. A mobile device screen may only be sufficient to display a portion of the program guide information block. For example, the mobile device screen may only show information for channels 421, 423, and 425. Nonetheless, some extra information may be downloaded in anticipation of a user requesting that information. Although the channels shown are contiguous, it should be noted that channels and times as well do not have to be contiguous.

In some examples, a media content delivery server can remember channels or groups of channels frequently accessed by a user and provide the channels or groups of channels as part of a block of program guide information. In another example, a media content delivery server can recognize that a user typically views about a dozen or so popular channels and provide several pages of scroll down program guide information to a user preemptively even before the user performs any scrolling. In still other examples, a media content delivery server can recognize user viewing or listening patterns and download blocks of program guide content information believed to be of interest to a user. Similarly, a media content delivery server can determine times when media is frequently accessed and provide blocks of program guide information based on viewing times. A wide variety of algorithms can be implemented to intelligently select portions of program guide content information for download to a mobile device without having to download the entire program guide. Resources can be conserved while still providing the user with an active and dynamic experience.

Figure 5:
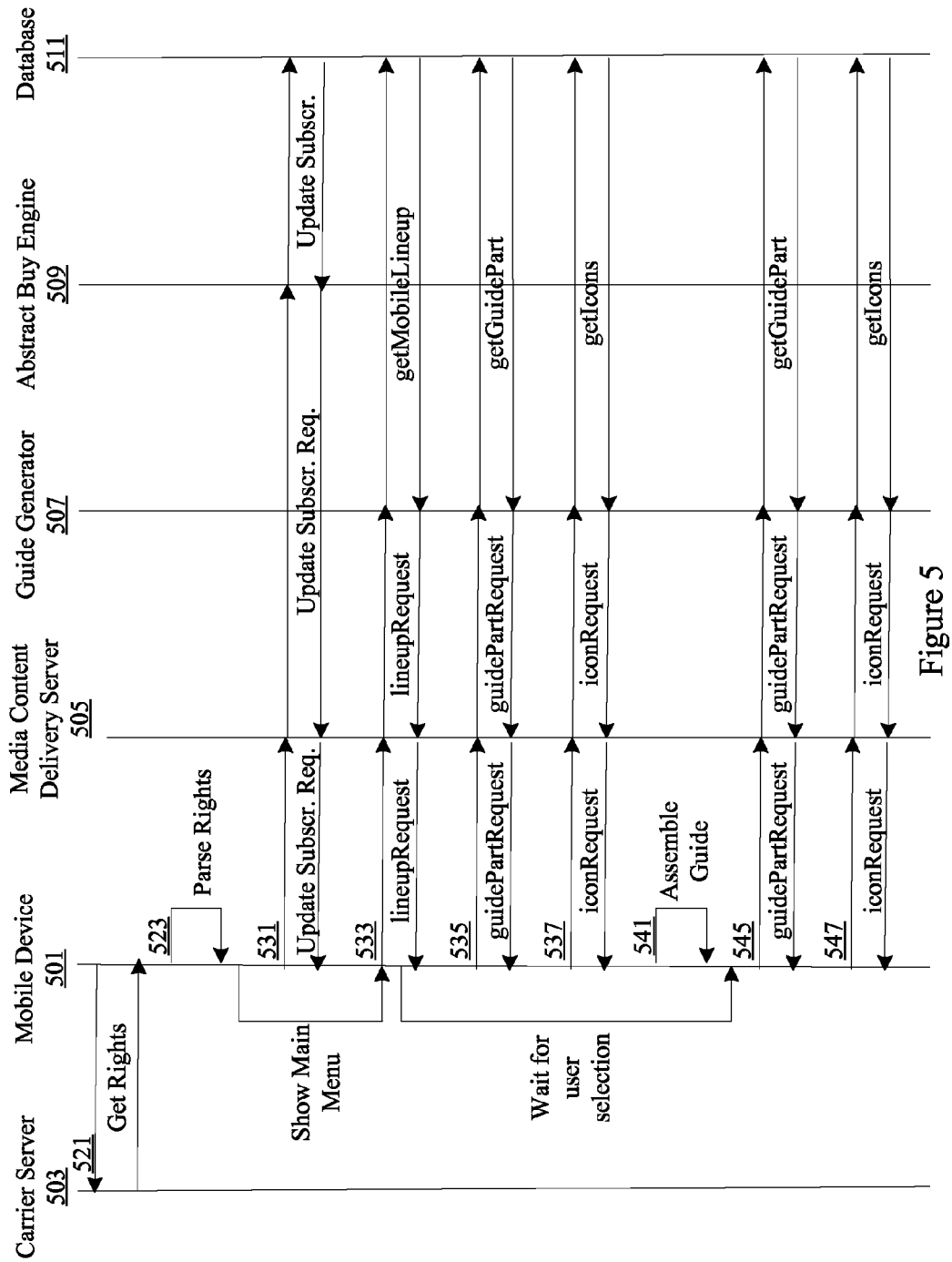
FIG. 5 illustrates a particular example of a guide request sequence.

FIG. 5 is an exchange diagram showing one example of a mobile guide delivery sequence. A mobile device 501 obtains subscription service rights information from a carrier server 503. In particular embodiments, subscription rights are obtained for all user registered devices. According to various embodiments, the mobile device parses and displays information associated with the rights at 523. In one example, a root menu showing subscribed and available channels is shown for a particular device.

According to various embodiments, the mobile device 501 sends an update subscriptions request message at 531 to a media content delivery server 505. The media content delivery server 505 forwards the update subscriptions request message to an abstract buy engine 509. The abstract buy engine 509 sends an update subscriptions message to the database 511. The mobile device 501 also sends a lineup request message 533 to the media content delivery server 505. The lineup request message is forwarded to a guide generator 507. The guide generator obtains a lineup for the mobile device from the database 511. The abstract buy engine 509 is not involved in this particular request transaction. At 535, the mobile device sends a guide part request to the media content delivery server 505. In some examples, the request is a request for the entire program guide. In typical examples, the request is a request for a portion of the guide or a program guide information block. The program guide information block request is forwarded to a guide generator 507. The guide generator obtains the guide part from a database 511 or generates it based on other information.

In some examples, icons are also requested by the mobile device 501 at 537. The mobile device 501 sends an icon request to the media content delivery server 505. The media content delivery server 505 forwards the icon request to the guide generator 507. The guide generator obtains icons from the database 511. According to various embodiments, other information such as advertisements and media clips are also requested or provided along with the icons. At 541, the guide is assembled at the mobile device 501. According to various embodiments, the most popular real-time content is shown and display first. The user can then scroll through the guide or jump to a particular location in the guide. Some portions of the guide may not yet be downloaded. Consequently, additional guide part requests and icon requests may be sent by a mobile device 501 at 545 and 547. The additional program guide information block requests and icon requests at 545 and 547 may be sent for different channels, different channel blocks, or different time periods.

Figure 6:
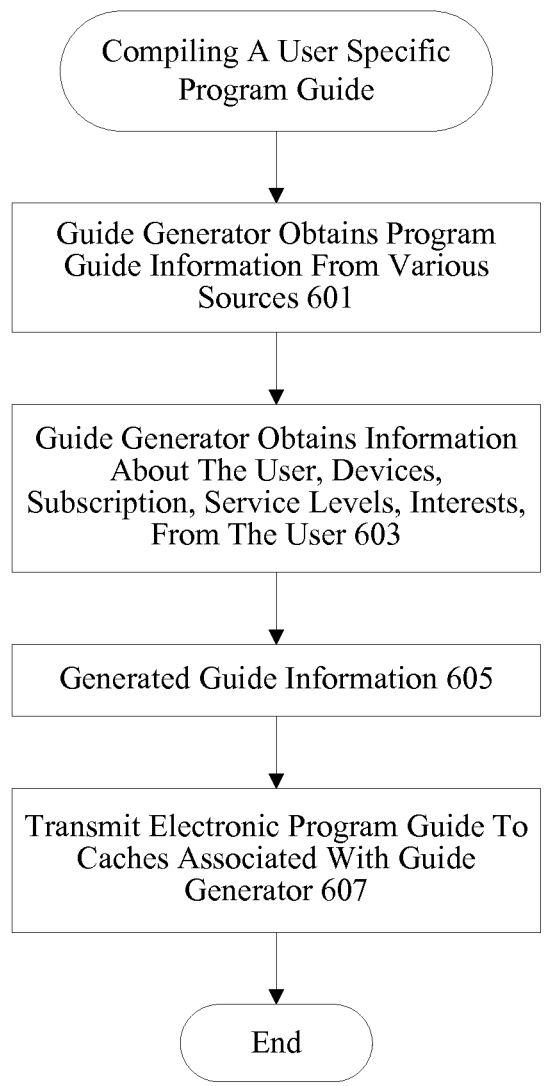
FIG. 6 illustrates one technique for generating user specific electronic program guides.

FIG. 6 is a flow process diagram showing one example of a technique for generating a user specific electronic program guide. At 601, a guide generator obtains program guide information from various sources such as content providers. The program guide information gives program descriptions, titles, ratings, as well as time and data information. At 603, the guide generator also obtains information about the user, devices, subscription, service levels, interests, etc., about the user. For example, the guide generator may determine that the user has an unlimited content subscription on a set top box, a time limited content subscription on a computer system, an exclusive content package on a mobile device, etc. Electronic program guides specific to the user, user devices, time, region, etc., are generated and automatically provided to a user registered device. At 605, the guide generator compiles an electronic program guide. According to various embodiments, user specific guides may be compiled constantly and broadcast to caches whenever significant change is noted.

At 607, the electronic program guide is transmitted to caches associated with the guide generator to allow rapid retrieval of content. According to various embodiments, the program guide can be continuously updated and reordered based on viewership information. In particular embodiments, a simple numerical ranking is sent as updates to individual users. The rankings allow individual client devices to order channels and video clips in an order desired. In still other embodiments, only a subset of the most popular programs are ranked. Other video content can still be provided in channel based numerical order. For example, the real-time most popular video content can be provided as a first page of a program guide. The entire program guide can be provided below are most watched section.

According to particular embodiments, the electronic program guide is provided to client devices and displayed in order of real-time popularity. Real-time most watched electronic program guide content can be provided before least watched electronic program guide content.

Figure 7:
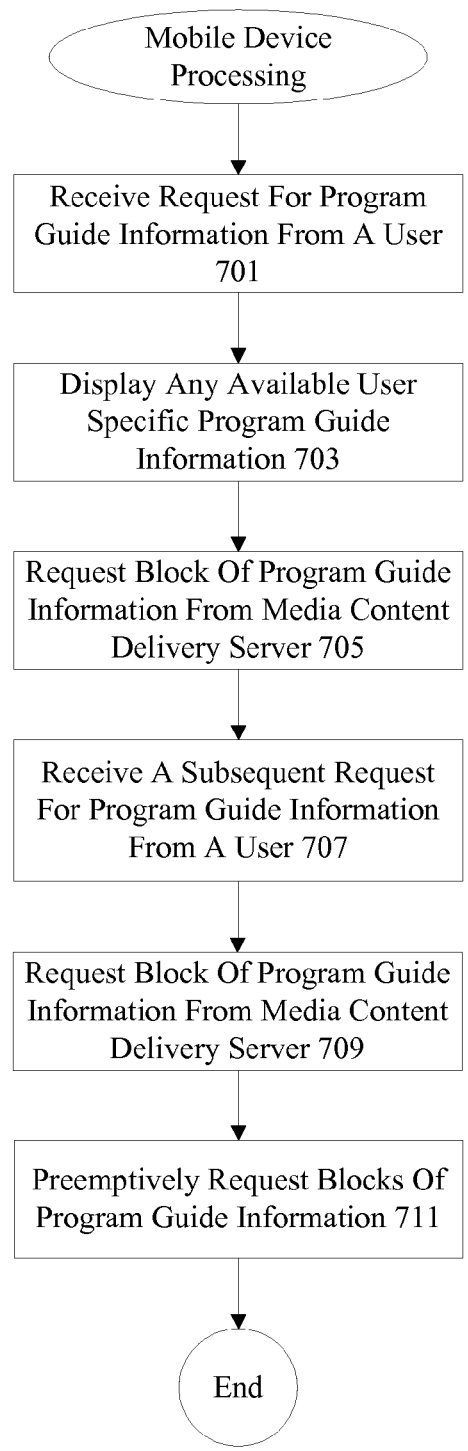
FIG. 7 illustrates one example of a system for implementing various embodiments.

FIG. 7 is a flow process diagram showing one example of a request for program guide information. At 701, a request for program guide information is received from a user. The request may result from a user selection to view a certain portion of a program guide. According to various embodiments, some program guide information may already be available on the device. For example, a listing of channels may be available. At 703, any program guide information available is displayed. At 705, a client device requests a block of program guide information from a media content delivery server. The block of program guide information may have a size determined by the screen of a client device. Alternatively, the block of program guide information may have a size determined by the amount of memory available on the client device. Other considerations such as bandwidth availability can also be taken into account. According to particular embodiments, the real-time most popular video content is provided in a first block. At 707, a client device receives a subsequent request from a user for program guide information.

According to various embodiments, the subsequent request results from a user scrolling, jumping, or otherwise navigating to a particular portion of a program guide. If the client device does not already have the information, the block of program guide information is requested from a media content delivery server at 709. It should be noted that program guide information can also be requested from other entities related to media content delivery servers. At 711, blocks of program guide information can be preemptively requested. Alternatively, blocks of program guide information can be preemptively provided to a client device. A variety of client devices can be used. According to various embodiments, a client device includes a display, a processor, memory, an interface operable to communicate with a media content delivery server, and an input interface operable to allow a user to operate the device. Possible client devices include cellular phones, personal digital assistants, portable computing devices, etc.

FIG. 8 illustrates one example of a server. According to particular embodiments, a system 800 suitable for implementing particular embodiments of the present invention includes a processor 801, a memory 803, an interface 811, and a bus 815 (e.g., a PCI bus or other interconnection fabric) and operates as a streaming server. When acting under the control of appropriate software or firmware, the processor 801 is responsible for modifying and transmitting live media data to a client. Various specially configured devices can also be used in place of a processor 801 or in addition to processor 801. The interface 811 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 800 is a fragment server that also includes a transceiver, streaming buffers, and a program guide database. The fragment server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server 891 handles requests and responses for media content related transactions while a separate streaming server provides the actual media streams.

Although a particular fragment server 891 is described, it should be recognized that a variety of alternative configurations are possible. For example, some modules such as a report and logging module 853 and a monitor 851 may not be needed on every server. Alternatively, the modules may be implemented on another device connected to the server. In another example, the server 891 may not include an interface to an abstract buy engine and may in fact include the abstract buy engine itself. A variety of configurations are possible.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

The invention claimed is:

1. A system, comprising:
   a processor configured to identify a user and a first device and a second device associated with the user, wherein the first device is a mobile device and the second device is a set top box, wherein the processor is configured to determine a first content level corresponding to a first set of channels and a first service level for media the user is authorized to receive on the first device and a second content level corresponding to a second set of channels and a second service level for media the user is authorized to receive on the second device, the second set of channels including all channels across all devices that the user is authorized to access;
   an interface configured to detect that the user has transitioned to a second device;
   a guide generator configured to create a first electronic program guide using the first content level and the first service level and a second electronic program guide using the second content level and the second service level, wherein the first electronic program guide and the second electronic program guide are different; and
   a location detection system configured to determine whether the user is in the vicinity of the second device based on mobile device location data associated with the first device, wherein the first electronic program guide or the second electronic program guide is presented based on the user's determined vicinity to the second device.

2. The system of claim 1, wherein the first service level corresponds to a first media stream resolution.

3. The system of claim 2, wherein the second service level corresponds to a second media stream resolution different from the first media stream resolution.

4. The system of claim 1, wherein the first electronic program guide is customized based on the first content level, the first service level, and user preferences.

5. The system of claim 4, wherein the second electronic program guide is customized based on the second content level, the second service level, and user preferences.

6. A method, comprising:
   identifying a user and a first device associated with the user;
   determining a first content level corresponding to a first set of channels and a first service level for media the user is authorized to receive on the first device, wherein the first device is a mobile device;
   generating a first electronic program guide using the first content level and the first service level;
   detecting, via a location detection system, that the user is in the vicinity of the second device based on mobile device location data associated with the first device;
   determining a second content level corresponding to a second set of channels and a second service level for media the user is authorized to receive on the second device, wherein the second device is a set top box, the second set of channels including all channels across all devices that the user is authorized to access;
   generating a second electronic program guide using the second content level and the second service level, wherein the second electronic program guide is different from the first electronic program guide.

7. The method of claim 6, wherein the first service level corresponds to a first media stream resolution.

8. The method of claim 7, wherein the second service level corresponds to a second media stream resolution different from the first media stream resolution.

9. The method of claim 6, wherein the first electronic program guide is customized based on the first content level, the first service level, and user preferences.

10. The method of claim 9, wherein the second electronic program guide is customized based on the second content level, the second service level, and user preferences.

11. The method of claim 6, wherein a transition to a third device is detected.

12. The method of claim 11, wherein the third device is a computer system.

13. The method of claim 12, wherein a third content level and a third service level for media the user is authorized to receive on the third device is determined 14. The method of claim 13, wherein a third electronic program guide is generated using the third content level and the third service level, wherein the third electronic program guide is different from both the first electronic program guide and the second electronic program guide.

15. An apparatus, comprising:
   means for identifying a user and a first device associated with the user;
   means for determining a first content level corresponding to a first set of channels and a first service level for media the user is authorized to receive on the first device, wherein the first device is a mobile device;
   means for generating a first electronic program guide using the first content level and the first service level;
   means for detecting that the user has transitioned to a second device;
   means for determining a second content level corresponding to a second set of channels and a second service level for media the user is authorized to receive on the second device, wherein the second device is a set top box, the second set of channels including all channels across all devices that the user is authorized to access;
   means for generating a second electronic program guide using the second content level and the second service level, wherein the second electronic program guide is different from the first electronic program guide; and
   means for determining whether the user is in the vicinity of the second device based on mobile device location data associated with the first device, wherein the first electronic program guide or the second electronic program guide is presented based on the user's determined vicinity to the second device.

16. The apparatus of claim 15, wherein the first service level corresponds to a first media stream resolution.

* * * * *